United States Patent [19]

Smith et al.

[11] Patent Number: 4,779,605

[45] Date of Patent: Oct. 25, 1988

[54] FOOD WARMER WELL HINGED CLAMP

[75] Inventors: Paul Smith, Minneapolis; Eugine W. Goad, Dayton, both of Minn.

[73] Assignee: The Vollrath Company, Sheboygan, Wis.

[21] Appl. No.: 97,952

[22] Filed: Sep. 17, 1987

[51] Int. Cl.⁴ .............................................. F24B 9/00
[52] U.S. Cl. ..................................... 126/33; 126/377; 126/369; 126/211; 4/633; 219/415
[58] Field of Search .................... 126/33, 214 B, 369, 126/214 R, 20, 214 A, 39 G, 211, 381, 377; 219/454, 433, 435, 459, 415–419; 99/339; 4/632, 633, 634, 635

[56] References Cited

U.S. PATENT DOCUMENTS

| | | | |
|---|---|---|---|
| 2,847,552 | 8/1958 | Gates | 126/33 |
| 3,008,149 | 11/1961 | Eynon | 4/633 |
| 3,008,150 | 11/1961 | Lyon, Jr. et al. | 4/633 |
| 3,561,020 | 2/1971 | Fritzsche | 126/214 A |
| 3,616,746 | 11/1971 | Sliwoski | 126/33 |

Primary Examiner—James C. Yeung
Attorney, Agent, or Firm—Olson & Hierl

[57] ABSTRACT

The present invention provides a hinged clamp which allows ease in both installing and removing drop-in type food warmers. A warmer well which is placed or dropped into a cut out defined in a counter top includes an outwardly extending flange to support the warmer well on the counter top. A nut provided on the outer surface of the warmer well has a corresponding threaded member which secures a clamping means which includes a body portion and an arm. To secure the warmer well in place, the body portion and arm are positioned away from the warmer well and secured to the nut by the threaded member, which causes the arm to secure against the counter top.

11 Claims, 2 Drawing Sheets 4,779,605

FOOD WARMER WELL HINGED CLAMP

FIELD OF THE INVENTION

The present invention relates to electric food warmers having a warmer unit to be dropped into a cabinet and means to secure the drop-in warmer unit to the cabinet.

BACKGROUND OF THE INVENTION

Food warmers for maintaining precooked food at serving temperature are well known in the art. Two general types of these food warmers exist. The first is a portable, self contained food station either mounted on wheels or small enough for table top use. The second is a drop-in individual warmer well generally used with a pre-existing cabinet which is provided with a cut out in the counter top.

Because the portable, self contained food stations are often build by one manufacturer, the warmer wells can simply be fabricated integrally with the counter top to eliminate any sanitary problems associated with the connection between the warmer well and the counter top.

The drop-in individual warmer wells, however, cannot be manufactured integrally with the counter tops. The warmer wells are added to pre-existing cabinets by dropping the warmer well into the cut out. Thus, care must be taken to ensure that the connection between the warmer well and the counter top is sufficiently sealed to avoid any sanitary problems such as leakage of water or foodstuffs. This need is exemplified in many local health department codes regulating such seals.

In order to satisfy such sanitary regulations, sealing means of the prior art have sacrificed durability and ease of installation and removal of the drop-ins. For example, in one type seen in the prior art, stud welds are applied to the flange of the drop-ins which attached to holes or slots provided in the cabinets.

Use of such stud welds has two drawbacks. The stud welds often shear and break off during installation or removal of the drop-ins. In addition, the cabinets in which the drop-ins are placed must be fabricated with holes or slots to accept the stud welds.

In another type of sealing means seen in the prior art, a twist clamp is slot welded to the drop-in and twisted to engaged the cabinet in installation. While this type of sealing means avoids the breach off problems of the stud welds, they provide unsatisfactory clamping force against the cabinet In addition, installation is virtually permanent because reversing the twisted on clamp often destroys the twist clamps.

In still another type of sealing means seen in the prior art, a hinge is provided with one side of the hinge attached to the drop-in The other side of the hinge is secured to the counter top by a screw that threads through a bolt contained in the movable side of the hinge. An example of this can be seen in U.S. Pat. No. 3,361,089.

The problem with this hinge arrangement is that the screw head is accessed from the inside of the drop-in, and thus extends through a hole in the drop-in. This creates a new sanitary problem in that food products and water can find their way through this hole.

Accordingly, what is needed is a simple, inexpensive sealing means which is not susceptible to breakage or infringement of sanitary considerations and which allows ease of both installation and removal of the drop-ins.

SUMMARY OF THE INVENTION

The present invention provides a sanitary, inexpensive, reliable sealing means which allows ease in both installing and removing drop-in type food warmers.

A warmer well is fabricated by placing, or as the term is used in the industry, dropping it into a cut out defined in a counter top having a bottom surface. The warmer well includes means for supporting the warmer well on the counter top which is an outwardly extending flange in a preferred embodiment.

Receiving means provided on the outer surface of the warmer well has a corresponding securing means which secures a clamping means against the bottom surface of the counter top. This clamping means together with the flange holds the well on the counter top.

When the warmer well is dropped into the counter cut out, the clamping means is positioned adjacent to the warmer well so the warmer well can fit into the cut out. To secure the warmer well in place, the clamping means is positioned away from the warmer well and secured to the receiving means by the securing means, which causes the clamping means to secure against the bottom surface of the counter top.

DETAILED DESCRIPTION OF A PREFERRED EMBODIMENT

Figure 1:
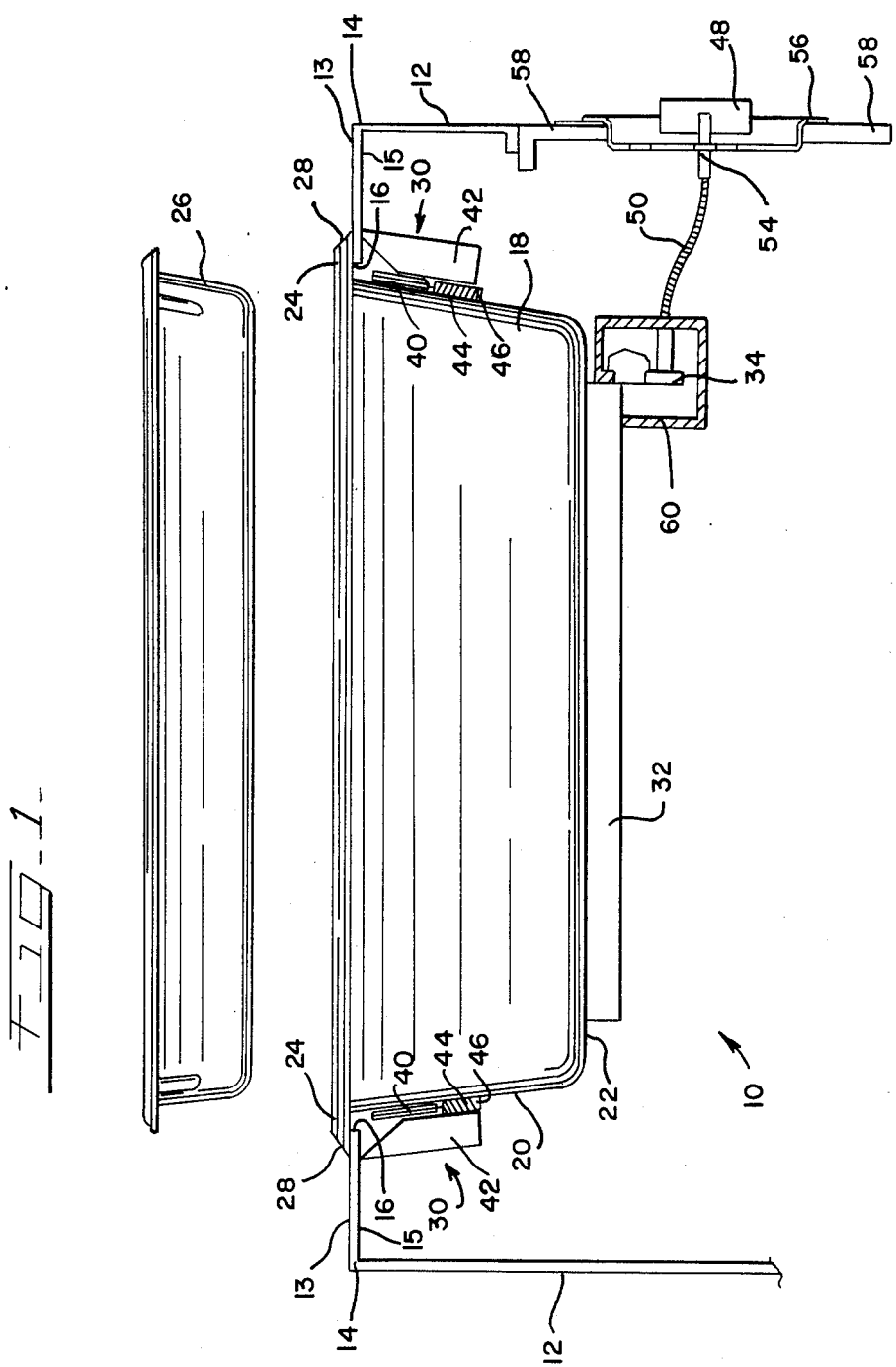
FIG. 1 is a side elevational view of the food warmer of the present invention shown installed in a cabinet.

Referring to FIG. 1, the food warmer of the present invention is indicated generally by the reference numeral 10. The food warmer 10 is a drop-in unit which is installed in an existing cabinet 12. The cabinet 12 includes a counter top 14 which defines a cut out 16. The counter top 14 has an upper surface 13 and a bottom surface 15. The cabinet 12 can be built into a structure such as restaurant or can be part of a portable unit. The upper surface 13 of the counter top 14 is made of an appropriate material such as stainless steel which meets standards for sanitary handling of foodstuffs. The cut out 16 is sized according to the size of the drop-in food warmer 10 to be installed, as discussed in more detail below.

The food warmer 10 includes a warmer well 18 which has continuous integral side walls 20 with a closed bottom 22, and an open top thereby defining an interior cavity. The integral side walls 20 provide a continuous surface lacking any holes or other deformations which may collect bacteria. The warmer well 18 is made of a suitable material such as stainless steel which has good sanitary qualities and is capable of conducting heat. The warmer well 18 can be shaped in any desired form suitable for stood storage and dispensing, typically rectangular or circular.

Support means for supporting the warmer well on the cabinet 12 are provided. In the described preferred embodiment, the support means is an outwardly extending flange 24 formed integrally with the warmer well 18 at the upper edge of the warmer well 18. When the warmer well 18 is dropped into the cut out 16 on the counter top 14, the flange 24 rests on the upper surface 13 of the counter top 14 to support the warmer well 18. Thus, the cut out 16 must be large enough to allow the warmer well to fit but must allow the flange 24 to rest upon the upper surface 15.

The flange 24 must be capable of supporting the weight of the warmer well 18, plus the weight of a serving pan 26 which is nested inside the warmer well 18, the food, and the additional weight applied by a server pushing down on the serving pan 26 when serving the food product. Thus, the outer periphery of the flange 24 is provided with a generally downwardly extending lip 28 to reinforce the flange 24.

As previously seen, the serving pan 26 is nested in the warmer well 18 during serving. The serving pan 26 is also provided with an outwardly extending ridge 28 to support the serving pan 26 on the warmer well 18 flange 24. For optimum performance, a chamber should be maintained between the warmer well 18 and the serving pan 26. Thus, the serving pan 26 is shallower in depth than the warmer well 18 to provide this chamber. If wet heat is desired for maintaining food warmth, a supply of water is added to the chamber by the user.

Means for heating the warmer well 18 are also provided. In the preferred embodiment, the heating means is a tubular type heating element encased in a dissipation plate 32. The dissipation plate 32 is attached to the bottom of the warmer well 18 by means known in the art to establish a heat transfer relationship between the two elements. The dissipation plate 32 is made of a suitable thermoconductive material such as aluminized steel.

A thermostat 34 is provided to control the temperature of the heating means. In the preferred embodiment, the thermostat 34 reads the temperature of the dissipation plate 32 and is thus placed in operative communication with the dissipation plate 32. However, the thermostat 34 can also be located to read the temperature at other locals, such as on the warmer well 18 itself.

The thermostat 34 is in operative communication with the heating means to control the supply of heat. In use, the thermostat 34 is set by the user to a desired temperature. This set temperature then establishes a small range of temperature at which the thermostat 34 will keep the dissipation plate 32. If the temperature of the dissipation plate 32 increases above the set temperature range, the thermostat 34 cuts off the supply of electricity to the heating means. If the temperature of the dissipation plate 32 falls below the set desired temperature range, electricity to the heating means will be supplied.

A thermostat control is also provided including a control knob 48 and a calibrated skirt 56 mounted on a mounting plate 58. The mounting plate 58 is capable of installation on the cabinet 12 at a user convenient local by simply attaching the mounting plate with screws. A flexible extension shaft 50 is fixably attached to the thermostat 34 and the control knob 48 to provide a direct, mechanical connection to the thermostat 34. See copending application to Paul Smith and Gene Goad entitled Food Warmer Thermostatic Control and Installation Method having the same filing date and incorporated by reference.

Figure 2:
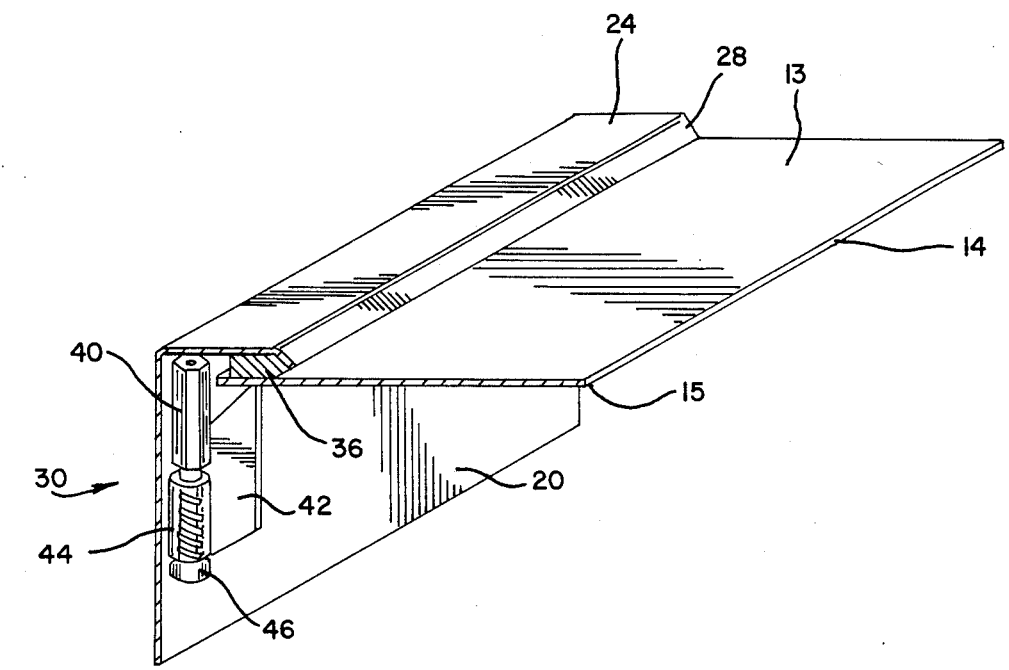
FIG. 2 is a cut away perspective view of the present invention taken along the line 2—2 of FIG. 1.

Due to sanitary considerations, the connection between the warmer well 18 and the upper surface 13 of the counter top 14 must be sealed to prevent sanitary problems such as leakage of water or foodstuffs. Thus, a gasket 36 is provided between the warmer well ridge 24 and the upper surface 13 as seen in FIG. 2.

To effectuate the seal between the warmer well 18 and the upper surface 13 provided by the gasket 36, the warmer well 18 must be securely fastened to the counter top 14. To this end, a hinged clamp is provided which is shown generally in FIGS. 1 and 2 by the reference numeral 30.

The hinged clamp 30 includes receiving means which is attached to the outer surface of the warmer well 18. Securing means which is exterior of the warmer well interior cavity is also provided for urging clamping means against the bottom surface 15 of the counter top 14 by cooperating with the receiving means.

In the preferred embodiment described herein, the receiving means is a nut 40 which is spot welded to the outer surface of the warmer well 18, the clamping means includes a body portion 44 and an arm 42, and the securing means is a threaded member 46. The threaded member 46 can be a screw or similar item which permits easy adjustment. The threaded member 46 secures the body portion 44 of the clamping means to the nut 40 by extending through a passageway defined in the body portion 44 to engage the nut 40. This secures the body portion 44 of the clamping means which urges the clamping means arm 42 against the bottom surface 15 of the counter top 14. The clamping means then exerts the sealing pressure perpendicularly to the surface of the counter top 14.

The position of the nut 40 on the warmer well 18 is dictated by the size of arm 42. The nut 40 is positioned on the warmer well 18 so that when the body portion 44 is secured against the nut 40 by the threaded member 46, the arm 42 is secured against the bottom surface 15 of the counter top 14.

Thus, to install the drop-in food warmer 10 of the present invention, the warmer well 18 including the dissipation plate 32 and the thermostat 34 are dropped into the cut out 16 defined in the counter top 14. The warmer well 18 is supported by the warmer well flange 28 resting on the upper surface 13 of the counter top 14, with the gasket 36 contained therebetween.

When the warmer well 18 is dropped into the cut out 16, the body portion 44 of the clamping means is attached to the nut 40 by the threaded member 46 but is not secured, and the arm 42 is positioned against the warmer well 18 so the hinged clamp 30 can pass into the cut out 16.

To secure the warmer well 18, the arm 42 is pivoted away from the warmer well 18 and the threaded member 46 is tightened in the nut 40. Thus, the arm 42 secures against the bottom surface 13 of the counter top 14. To remove the warmer well 18, the threaded member 46 is loosened, the arm 42 is pivoted against the washer well 18, and the warmer well 18 is removed. This provides for easy and quick installation. Because the hinged clamp is outside the well cavity, it does not interfere with the well or provide an area for bacterial growth. The hinged clamp also allows the well to be easily removed from the counter top for service.

It should be understood that various modifications, changes and variations in addition to those herein discussed may be made in the arrangement, operation and details of construction of the elements disclosed herein without departing from the spirit and scope of the invention.

What is claimed is:

1. A food warmer to be dropped into a cut out defined in a counter top having a bottom surface, comprising:

a warmer well having a bottom and side walls defining an interior cavity;

support means carried by the side walls for supporting the warmer well on the counter top;

receiving means on an outer surface of at least one side wall of the warmer well;

clamping means including a body portion defining a passageway and an arm extending from the body portion to engage the bottom surface of the counter top; and securing means extending through the clamping means passageway and engaging the receiving means for urging the clamping means against the bottom of the counter top to engage the bottom of the counter top.

2. The food warmer of claim 1 wherein the securing means is a threaded member extending through the passageway to engage the receiving means.

3. The food warmer of claim 2 wherein the receiving means is a nut.

4. The food warmer of claim 1 wherein the arm has a first position adjacent the side wall of the warmer well and a second position extending from the side wall of the warmer well to engage the bottom surface of the counter top.

5. The food warmer of claim 1 wherein the support means is a flange outwardly provided at the upper end of the warmer well larger than the cut out to support the warmer well on the counter top.

6. The food warmer of claim 3 wherein the nut is spot welded onto the side of the warmer well.

7. A process for installing an electrical unit for maintaining cooked food at serving temperature into a counter top having a cut out and a bottom surface, comprising the steps of:

providing receiving means which is fixably attached to an outer surface of a warmer well and securing means which cooperates with the receiving means;

pivoting clamping means which include a body portion defining a passageway and an arm extending from the body portion against the warmer well;

placing the warmer well into the cut out with the warmer well being supported on the counter top by a flange provided on the warmer well;

pivoting the arm of the clamping means away from the warmer well; and tightening the securing means in the receiving means to urge the body portion of the clamping means upward to securely engage the arm against the bottom surface of the counter top.

8. A food warmer to be dropped into a cut out defined in a counter top having a bottom surface, comprising:

a warmer well having bottom and side walls;

a flange outwardly provided at the upper end of the warmer well larger than the cut out to support the warmer well on the counter top;

receiving means provided on the outer surface of at least one side wall of the warmer well;

a clamping means having a body portion defining a passageway and an arm extending from the body portion, the arm being freely rotatable between a first position adjacent the side wall of the warmer well and a second position extending from the side wall of the warmer well; and a threaded member extending through the passageway of the body portion to engage the receiving means to secure the arm against the bottom surface of the counter top when the arm is positioned away from the warmer well.

9. The food warmer of claim 8 wherein the bottom and side walls of the warmer are of an integral one piece construction.

10. The food warmer of claim 8 wherein the receiving means is a nut.

11. The food warmer of claim 8 further including a gasket provided between the warmer well flange and the upper surface of the counter top to establish a seal between the warmer well and the counter top when the warmer well is secured.

* * * * *